US008576213B2

(12) United States Patent
Omoto et al.

(10) Patent No.: US 8,576,213 B2
(45) Date of Patent: Nov. 5, 2013

(54) DISPLAY APPARATUS AND DRIVING CONTROLLING METHOD

(75) Inventors: Keisuke Omoto, Kanagawa (JP); Masatsugu Tomida, Kanagawa (JP)

(73) Assignee: Sony Corporation, Tokyo (JP)

( * ) Notice: Subject to any disclaimer, the term of this patent is extended or adjusted under 35 U.S.C. 154(b) by 818 days.

(21) Appl. No.: 12/659,384

(22) Filed: Mar. 8, 2010

(65) Prior Publication Data

US 2010/0265233 A1 Oct. 21, 2010

(30) Foreign Application Priority Data

Apr. 15, 2009 (JP) ................................ 2009-098815

(51) Int. Cl.
*G06F 3/038* (2013.01)
*G09G 3/20* (2006.01)

(52) U.S. Cl.
USPC ............ 345/211; 345/55; 345/76; 315/169.3

(58) Field of Classification Search
USPC ............................ 345/55, 76, 211; 315/169.3
See application file for complete search history.

(56) References Cited

U.S. PATENT DOCUMENTS

2003/0227262 A1* 12/2003 Kwon ........................ 315/169.3

FOREIGN PATENT DOCUMENTS

| | | |
|---|---|---|
| JP | 2003-255856 A | 9/2003 |
| JP | 2003-271095 A | 9/2003 |
| JP | 2004-029791 A | 1/2004 |
| JP | 2004-093682 A | 3/2004 |
| JP | 2004-133240 A | 4/2004 |
| JP | 2006-133542 A | 5/2006 |

* cited by examiner

*Primary Examiner* — Amare Mengistu
*Assistant Examiner* — Jennifer Zubajlo
(74) *Attorney, Agent, or Firm* — Rader, Fishman & Grauer PLLC

(57) ABSTRACT

Disclosed herein is a display apparatus, including, a pixel array section including a plurality of pixels disposed in rows and columns, a number of power supply lines equal to the number of the rows of the pixels, each of the power supply lines being wired commonly to those of the pixels which are juxtaposed in a direction of a row, and a power supplying section adapted to supply a predetermined power supply potential to the pixels in the rows through the power supply lines.

12 Claims, 10 Drawing Sheets

DISPLAY APPARATUS AND DRIVING CONTROLLING METHOD

BACKGROUND OF THE INVENTION

1. Field of the Invention

This invention relates to a display apparatus and a driving controlling method, and more particularly to a display apparatus and a driving controlling method wherein mobility correction is carried out.

2. Description of the Invention

A panel of the planar self-luminous type which uses an organic electroluminescence (EL) element as a light emitting element has been and is being developed energetically in recent years. The organic EL element has a diode characteristic and utilizes a phenomenon that, if an electric field is applied to an organic thin film, then the organic thin film emits light. Since the organic EL element is a self-luminous element whose power consumption is low because it is driven by an applied voltage less than or equal to 10 V and which itself emits light. Therefore, the organic EL element has a characteristic that it does not require an illuminating member and reduction in weight and thickness is easy. Further, since the response speed of the organic EL element is as high as approximately several μs, the EL panel has an advantage that an after-image upon display of a dynamic image does not appear.

Among various EL panels, a panel of the active matrix type wherein a thin film transistor (TFT) as a driving element is formed in an integrated state in each pixel is being developed energetically. An active matrix EL panel is disclosed, for example, in Japanese Patent Laid-Open Nos. 2003-255856, 2003-271095, 2004-133240, 2004-029791 and 2004-093682.

Incidentally, it is generally known that a current-voltage characteristic, that is, an I-V characteristic, of an organic EL element deteriorates as time passes, or in other words, suffers from time-dependent deterioration. In a pixel circuit wherein particularly an N-channel TFT is used as a driving transistor for current-driving an organic EL element, if the I-V characteristic of the organic EL element suffers from time-dependent deterioration, then the gate-source voltage Vgs of the driving transistor varies. Since the source electrode side of the driving transistor is connected to the organic EL element, the emitted light luminance of the organic EL element is varied by the variation of the gate-source voltage Vgs of the driving transistor.

This is described more particularly. Where the organic EL element is connected to the source electrode side of the driving transistor, the source potential of the driving transistor depends upon the operating point of the driving transistor and the organic EL element. Then, if the I-V characteristic of the organic EL element deteriorates, then since the operating point of the driving transistor and the organic EL element varies, even if the same voltage is applied to the gate electrode of the driving transistor, the source potential of the driving transistor varies. This varies the source-gate voltage Vgs of the driving transistor, and consequently, the value of the current to flow to the driving transistor varies. As a result, also the value of current flowing to the organic EL element varies, and consequently, the emitted light luminance of the organic EL element varies.

Further, particularly in a pixel circuit which uses a polycrystalline TFT, in addition to the time-dependent deterioration of the I-V characteristic of the organic EL element, a transistor characteristic of the driving transistor varies as time passes or a transistor characteristic differs among different pixels due to a dispersion in the fabrication process. In particular, individual pixels indicate a dispersion of a transistor characteristic of the driving transistor. The transistor characteristic may be a threshold voltage Vth of the driving transistor, a mobility μ of a semiconductor thin film which forms a channel of the driving transistor, and so forth. It is to be noted that such a mobility μ as described above is hereinafter referred to simply as "mobility μ of the driving transistor."

If a transistor characteristic of the driving transistor differs among different pixels, then a dispersion of the value of current flowing to the driving transistor appears among individual pixels. Therefore, even if an equal voltage is applied to the gate electrode of the driving transistor among the pixels, a dispersion of the emitted light luminance of the organic EL element appears among the pixels. As a result, the uniformity of the screen image is lost or deteriorated.

Thus, a pixel circuit has been proposed which is provided with various correction or compensation functions in order to keep the emitted light luminance of the organic EL element fixed without being influenced by time-dependent deterioration of the I-V characteristic of the organic EL element, a time-dependent variation of a transistor characteristic of the driving transistor and so forth. The pixel circuit of the type described is disclosed, for example, in Japanese Patent Laid-Open No. 2006-133542.

The correction function may be a compensation function for a characteristic variation of the organic EL element, a correction function against a variation of the threshold voltage Vth of the driving transistor, a correction function against a variation of the mobility μ of the driving transistor or a like function. In the following description, correction against a variation of the threshold voltage Vth of the driving transistor is referred to as "threshold value correction," and correction against a variation of the mobility μ of the driving transistor is referred to as "mobility correction."

Where each pixel circuit is provided with various correction functions in this manner, the emitted light luminance of the organic EL element can be kept fixed without being influenced by time-dependent deterioration of the I-V characteristic of the organic EL element or a time-dependent variation of a transistor characteristic of the driving transistor. As a result, the display quality of the display apparatus can be improved.

SUMMARY OF THE INVENTION

Incidentally, the mobility correction is carried out utilizing the fact that the rise amount of the source potential of the driving transistor varies depending upon the mobility μ. More particularly, the rise amount of the source potential of a driving transistor having a high mobility μ is great, but the rise amount of the source potential of another driving transistor which has a low mobility μ is small. Accordingly, the dispersion of the mobility μ of the driving transistor in individual pixels can be compensated for by adjusting the period of time within which mobility correction is carried out to a predetermined period of time.

However, conversely speaking, where a circuit constant of each pixel is fixed, the period of time required for the mobility correction is determined inevitably and cannot be shortened. Accordingly, the period of time required for driving one pixel cannot be reduced and high speed driving is difficult.

Therefore, it is desirable to provide a display apparatus and a driving controlling method wherein the period of time required for mobility correction can be reduced.

According to an embodiment of the present invention, there is provided a display apparatus including a pixel array section including a plurality of pixels disposed in rows and columns, a number of power supply lines equal to the number of the rows of the pixels, each of the power supply lines being wired commonly to those of the pixels which are juxtaposed in a direction of a row, and a power supplying section adapted to supply a predetermined power supply potential to the pixels in the rows through the power supply lines, each of the pixels including a light emitting element having a diode characteristic and adapted to emit light in response to driving current, a sampling transistor adapted to sample an image signal, a driving transistor adapted to supply the driving current to the light emitting element, an accumulating capacitor connected between an anode of the light emitting element and a gate of the driving transistor and adapted to retain a predetermined potential, and an auxiliary capacitor connected between the anode of the light emitting element and the power supply line for an adjacent pixel positioned adjacent the pixel in the direction of a column and adapted to retain a predetermined potential, the power supplying section temporarily raising, during mobility correction of the pixel, the power supply potential of the power supply line for the adjacent pixel to which the auxiliary capacitor is connected.

According to another embodiment of the present invention, there is provided a driving controlling method for a display apparatus which includes a pixel array section including a plurality of pixels disposed in rows and columns, a number of power supply lines equal to the number of the rows of the pixels, each of the power supply lines being wired commonly to those of the pixels which are juxtaposed in a direction of a row, and a power supplying section adapted to supply a predetermined power supply potential to the pixels in the rows through the power supply lines and wherein each of the pixels including a light emitting element having a diode characteristic and adapted to emit light in response to driving current, a sampling transistor adapted to sample an image signal, a driving transistor adapted to supply the driving current to the light emitting element, an accumulating capacitor connected between an anode of the light emitting element and a gate of the driving transistor and adapted to retain a predetermined potential, and an auxiliary capacitor connected between the anode of the light emitting element and the power supply line for an adjacent pixel positioned adjacent the pixel in the direction of a column and adapted to retain a predetermined potential, including a step executed by the power supplying section of temporarily raising, during mobility correction of the pixel, the power supply potential of the power supply line for the adjacent pixel to which the auxiliary capacitor is connected.

In the display apparatus and the driving controlling method for a display apparatus, the power supply potential of the power supply line for an adjacent pixel which is positioned adjacent the pixel during the mobile correction in the direction of a column and to which the auxiliary capacitor of the pixel is connected is temporarily raised.

With the display apparatus and the driving controlling method for a display apparatus, the time required for the mobility correction can be reduced.

DETAILED DESCRIPTION OF THE PREFERRED EMBODIMENT

[Mode of a Display Apparatus on Which the Present Invention is Based]

First, in order to facilitate understandings of the present invention and make the background of the present invention clear, a configuration and operation of a display apparatus on which the present invention is based are described with reference to FIGS. 1 to 4.

Figure 1:
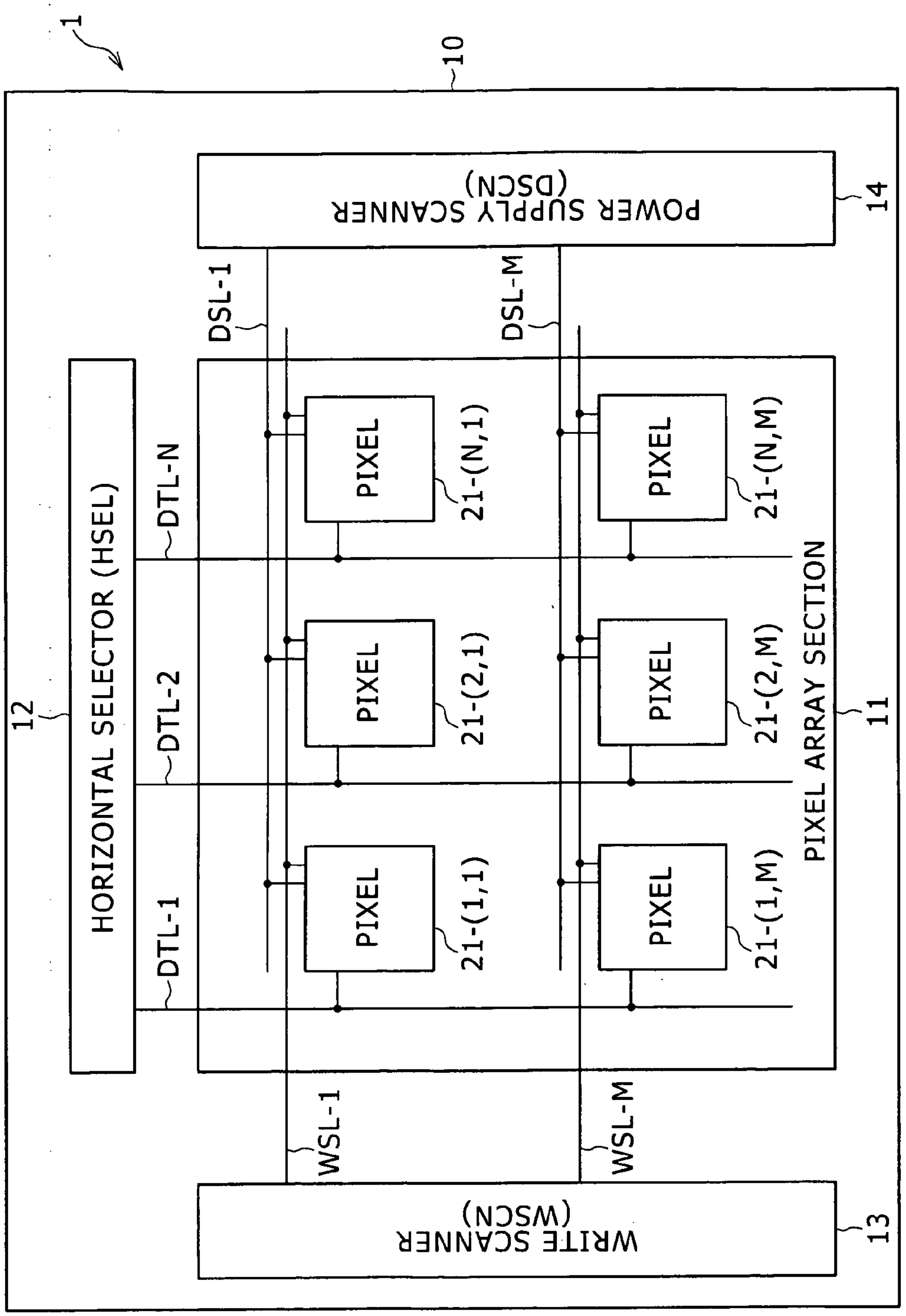
FIG. 1 is a block diagram showing an example of a configuration of a display apparatus on which the present invention is based.

FIG. 1 shows an example of a configuration of a display apparatus on which the present invention is based.

Referring to FIG. 1, the display apparatus 1 shown is, for example, a television receiver and displays an image corresponding to an image signal inputted thereto on an EL panel 10. The EL panel 10 uses an organic EL (electroluminescence) element as a self-luminous element. The EL panel 10 is incorporated as a panel module, which includes a driver IC (integrated circuit) including source drivers and gate drivers, in the display apparatus 1. The display apparatus 1 further includes a power supply circuit, an image LSI (Large Scale Integration) and so forth not shown. It is to be noted that the EL panel 10 of the display apparatus 1 can be utilized also as a display section for a portable telephone set, a digital still camera, a digital video camera, a printer and so forth.

The EL panel 10 includes a pixel array section 11 having a plurality of pixels 21, a horizontal selector (HSEL) 12, a write scanner (WSCN) 13 and a power supply scanner (DSCN) 14.

In the pixel array section 11, N×M (N and M are integral values higher than 1 and independent of each other) pixels 21-(1,1) to 21-(N,M) are disposed in an array. It is to be noted that, from a restriction in illustration, only some of the pixels 21-(1,1) to 21-(N,M) are shown in FIG. 1.

The EL panel 10 further includes M scanning lines WSL-1 to WSL-M, M power supply lines DSL-1 to DSL-M and N image signal lines DTL-1 to DTL-N.

It is to be noted that, in the following description, where there is no necessity to specifically distinguish the scanning lines WSL-1 to WSL-M, each of them is referred to simply as scanning line WSL. Further, where there is no necessity to specifically distinguish the image signal lines DTL-1 to DTL-N, each of them is referred to simply as image signal line DTL. Further, where there is no necessity to specifically distinguish the pixels 21-(1,1) to 21-(N,M) and the power supply lines DSL-1 to DSL-M, each of them is referred to simply as pixel 21 and power supply line DSL, respectively.

The horizontal selector 12, write scanner 13 and power supply scanner 14 operate as a driving section for driving the pixel array section 11.

The pixels 21-(1,1) to 21-(N,1) in the first row from among the pixels 21-(1,1) to 21-(N,M) are connected to the write scanner 13 and the power supply scanner 14 by the scanning line WSL-1 and the power supply line DSL-1, respectively.

Further, the pixels 21-(1,M) to 21-(N,M) of the Mth row from among the pixels 21-(1,1) to 21-(N,M) are connected to the write scanner 13 and the power supply scanner 14 by the scanning line WSL-M and the power supply line DSL-M, respectively. In particular, one scanning line WSL and one power supply line DSL are wired commonly to the pixels juxtaposed in the direction of a row. Also the other pixels 21 juxtaposed in the direction of a row in the pixels 21-(1,1) to 21-(N,M) are connected in a similar connection scheme.

Further, the pixels 21-(1,1) to 21-(1,M) in the first column from among the pixels 21-(1,1) to 21-(N,M) are connected to the horizontal selector 12 by the image signal line DTL-1. The pixels 21-(N,1) to 21-(N,M) in the Nth column from among the pixels 21-(1,1) to 21-(N,M) are connected to the horizontal selector 12 by the image signal line DTL-N. In particular, one image signal line DTL is wired commonly to the pixels juxtaposed in the direction of a column. Also the other pixels 21 juxtaposed in the column direction from among the pixels 21-(1,1) to 21-(N,M) are connected in a similar connection scheme.

The write scanner 13 supplies sequential control signals to the scanning lines WSL-1 to WSL-M in a horizontal period (1F) to line-sequentially scan the pixels 21 in a unit of a row. The power supply scanner 14 supplies a power supply potential of a first high potential Vcc1 or a low potential Vss illustrated in FIG. 4 to the power supply lines DSL-1 to DSL-M in synchronism with the line-sequential scanning. The horizontal selector 12 supplies a signal potential Vsig corresponding to an image signal and a reference potential Vofs illustrated in FIG. 4 switchably to the image signal lines DTL-1 to DTL-M in the columns within each horizontal period (1F) in synchronism with the line-sequential scanning.

[Array Configuration of the Pixels 21 of the EL Panel 10]

Figure 2:
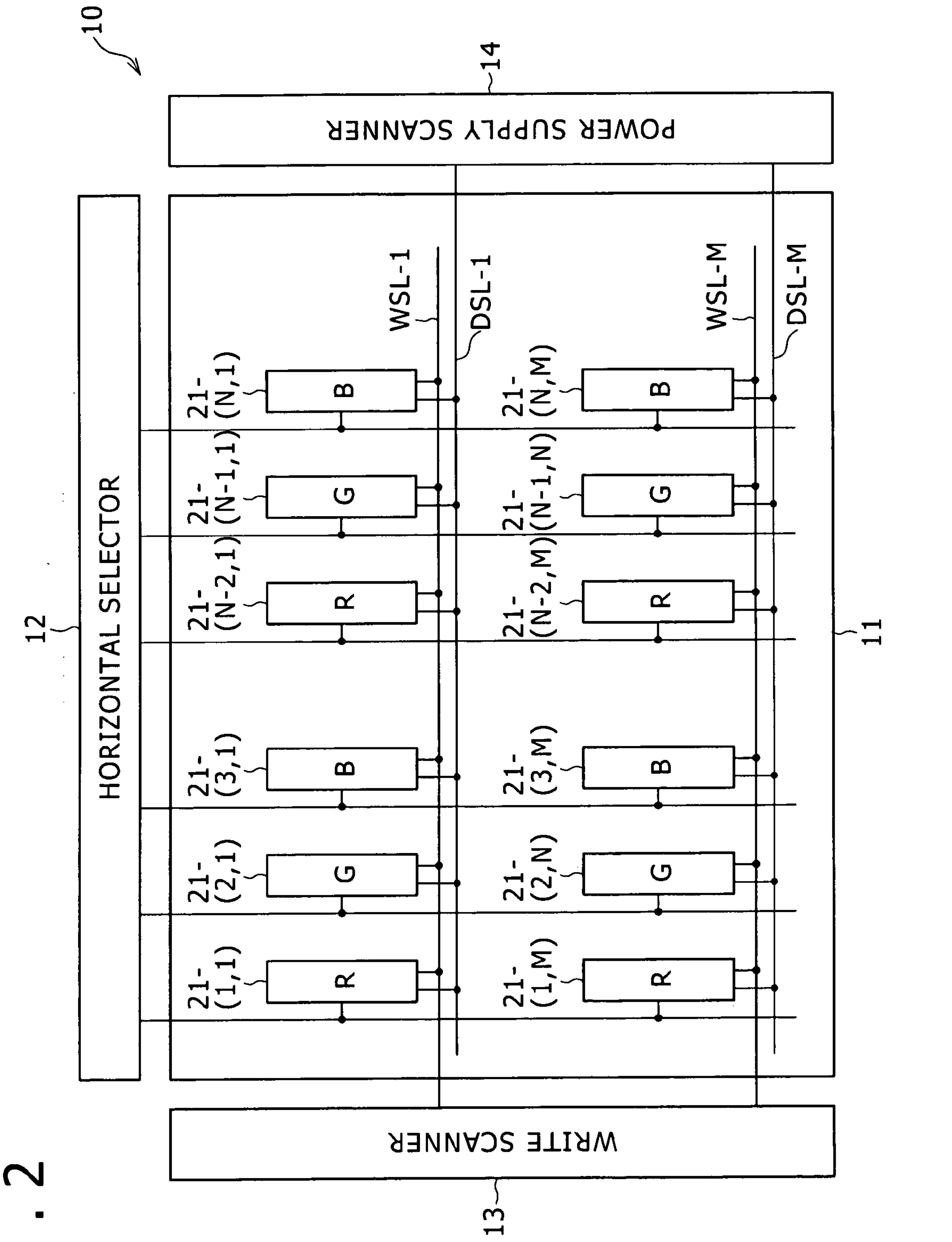
FIG. 2 is a block diagram illustrating an array of colors of pixels of an EL panel shown in FIG. 1.

FIG. 2 shows an array of colors of light emitted from the pixels 21 of the EL panel 10.

It is to be noted that FIG. 2 is different from FIG. 1 in that the scanning lines WSL and the power supply lines DSL are shown connected to the pixels 21 from the lower side. To which side of the pixels 21 the scanning lines WSL, power supply lines DSL and image signal lines DTL are connected can be changed suitably in accordance with the wiring line layout. Also the arrangement of the horizontal selector 12, write scanner 13 and power supply scanner 14 with respect to the pixel array section 11 can be suitably changed similarly.

Each of the pixels 21 of the pixel array section 11 emits light of one of the primary colors of red (R), green (G) and blue (B). The colors are arrayed such that, for example, red, green and blue are arrayed in order in the direction of a row, but in the direction of a column, the same color appears in the same column. Accordingly, the pixels 21 correspond to so-called subpixels, and one pixel as a unit of display is formed from three pixels 21 of red, green and blue juxtaposed in the direction of a row, that is, in the leftward and rightward direction in FIG. 2. It is to be noted that the array of colors of the EL panel 10 is not limited to the specific array shown in FIG. 2.

[Detailed Circuit Configuration of the Pixels 21 of the EL Panel 10]

Figure 3:
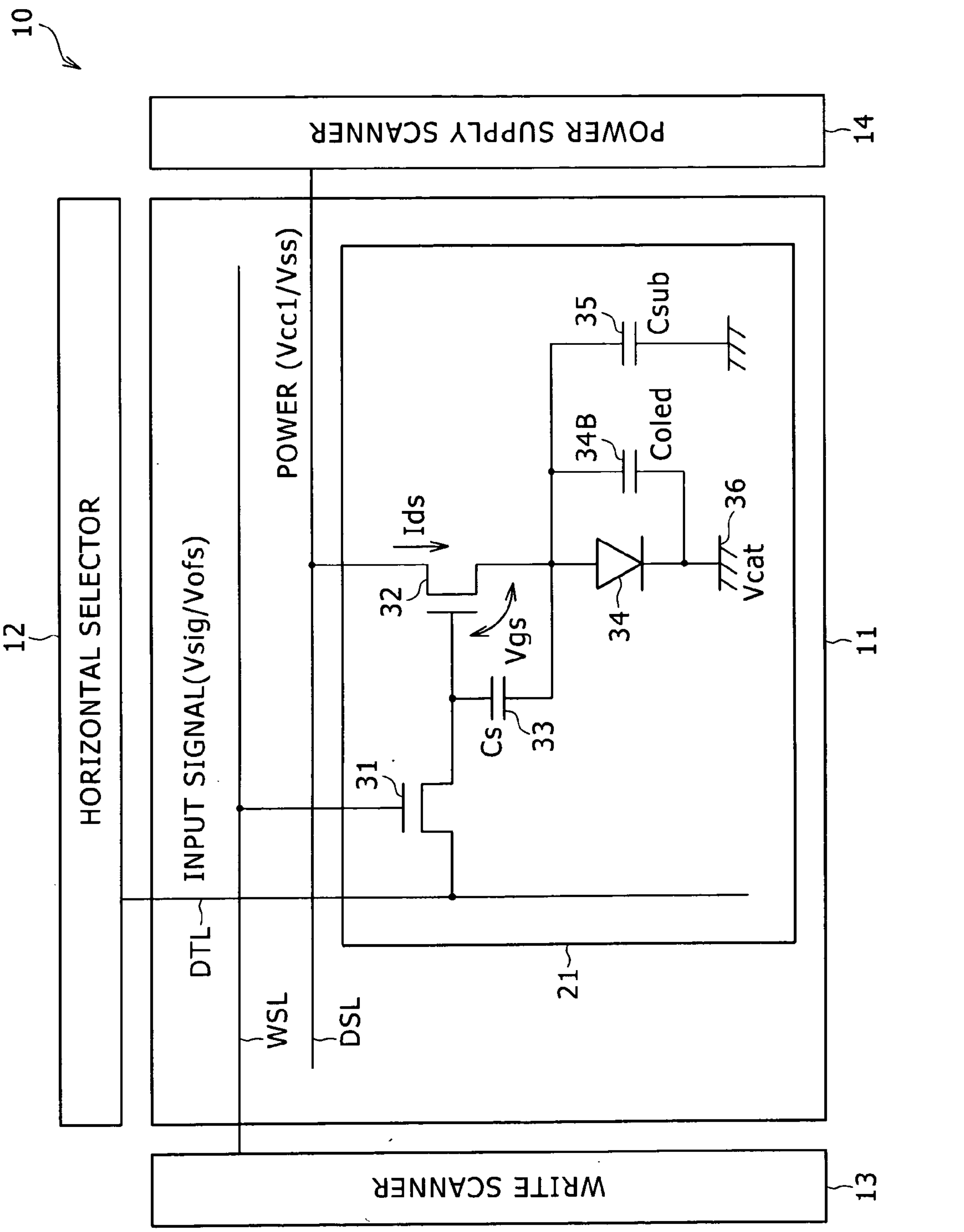
FIG. 3 is a block diagram showing a configuration of an equivalent circuit of a pixel shown in FIG. 1.

FIG. 3 shows a configuration of an equivalent circuit of a pixel circuit of one of the N×M pixels 21 included in the EL panel 10.

It is to be noted that, if the pixel 21 shown in FIG. 3 is a pixel 21-(n, m) (n=1, 2, . . . , N and m=1, 2, . . . , M), then the scanning line WSL, image signal line DTL and power supply line DSL are such as follows. In particular, the scanning line WSL, image signal line DTL and power supply line DSL are the scanning line WSL-n, image signal line DTL-n and power supply line DSL-m corresponding to the pixel 21-(n, m), respectively.

The pixel 21 shown in FIG. 3 includes a sampling transistor 31, a driving transistor 32, an accumulating capacitor 33, a light emitting element 34, and an auxiliary capacitor 35. Further, in FIG. 3, also a capacitance component which the light emitting element 34 has is shown as a light emitting element capacitor 34B. Here, the accumulating capacitor 33, light emitting element capacitor 34B and auxiliary capacitor 35 have capacitance values Cs, Coled and Csub, respectively.

The sampling transistor 31 is connected at the gate thereof to the scanning line WSL and at the drain thereof to the image signal line DTL. Further, the sampling transistor 31 is connected at the source thereof to the gate of the driving transistor 32.

The driving transistor 32 is connected at one of the source and the drain thereof to the anode of the light emitting element 34 and at the other of the source and the drain thereof to the power supply line DSL. The accumulating capacitor 33 is connected between the gate of the driving transistor 32 and the anode of the light emitting element 34. Further, the light emitting element 34 is connected at the cathode thereof to a wiring line 36 which is set to a predetermined potential Vcat. The potential Vcat is the ground (GND) level, and accordingly, the wiring line 36 is, a grounding line.

The auxiliary capacitor 35 is provided to supplement the capacitance component of the light emitting element 34, that is, the light emitting element capacitor 34B and is connected in parallel to the light emitting element 34. In particular, the auxiliary capacitor 35 is connected at one of electrodes thereof to the anode side of the light emitting element 34 and at the other electrode thereof to the cathode side of the light emitting element 34. Where the auxiliary capacitor 35 is provided and retains a predetermined potential in this manner, the input gain of the driving transistor 32 can be improved. Here, the input gain of the driving transistor 32 is a ratio of a rise amount of the source potential Vs with respect to a rise amount of the gate potential Vg of the driving transistor 32 within a writing+mobility correction period $T_5$ hereinafter described with reference to FIG. 4.

The sampling transistor 31 and the driving transistor 32 are N-channel transistors. Therefore, the sampling transistor 31 and the driving transistor 32 can be formed from amorphous silicon which can be produced at a lower cost than low temperature polycrystalline silicon. Consequently, the pixel circuit can be produced at a reduced cost. Naturally, the sampling transistor 31 and the driving transistor 32 may otherwise be formed from low temperature polycrystalline silicon or single crystal silicon.

The light emitting element 34 is formed from an organic EL element. The organic EL element is a current-driven light emitting element having a diode characteristic. Therefore, the light emitting element 34 emits light of a gradation which depends upon the current value Ids supplied thereto.

In the pixel 21 configured in such a manner as described above, the sampling transistor 31 is turned on or rendered conducting in response to a selection control signal from the scanning line WSL and samples an image signal of the signal potential Vsig corresponding to a gradation through the image signal line DTL. The accumulating capacitor 33 accumulates and retains charge supplied thereto from the horizontal selector 12 through the image signal line DTL. The driving transistor 32 is supplied with current from the power supply line DSL having the first high potential Vcc1 and supplies driving current Ids to the light emitting element 34 in response to the signal potential Vsig retained in the accumulating capacitor 33. The predetermined driving current Ids flows to the light emitting element 34, and the pixel 21 emits light.

The pixel 21 has a threshold value correction function. The threshold value correction function is a function of causing the accumulating capacitor 33 to retain a voltage corresponding to a threshold voltage Vth of the driving transistor 32. Where the threshold value correction function is exhibited, an influence of the threshold voltage Vth of the driving transistor 32 which makes a cause of a dispersion for each pixel of the EL panel 10 can be canceled.

The pixel 21 has a mobility correction function in addition to the threshold value correction function described above. The mobility correction function is a function of applying, when the signal potential Vsig is retained in the accumulating capacitor 33, correction to the mobility μ of the driving transistor 32.

Furthermore, the pixel 21 has a bootstrap function. The bootstrap function is a function of causing the gate potential Vg to interlock with the variation of the source potential Vs of the driving transistor 32. Where the bootstrap function is exhibited, the voltage Vgs between the gate and the source of the driving transistor 32 can be maintained fixed.

[Operation of the Pixel 21 of the EL Panel 10]

Figure 4:
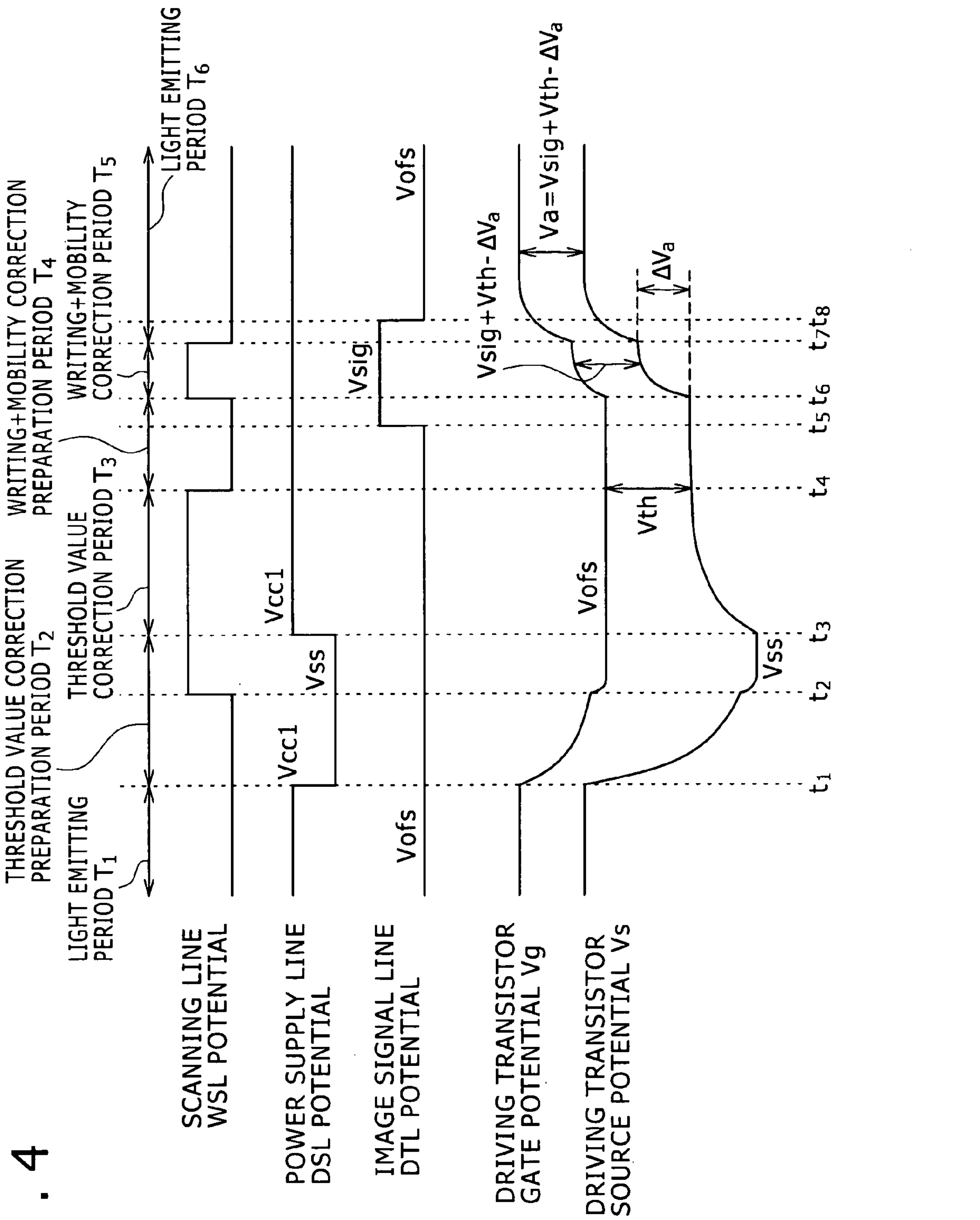
FIG. 4 is a timing chart illustrating operation of a pixel shown in FIG. 1.

FIG. 4 illustrates operation of the pixel 21.

In particular, FIG. 4 illustrates a voltage variation of the scanning line WSL, power supply line DSL and image signal line DTL with respect to the same time axis, which extends in the horizontal direction in FIG. 4 and a corresponding variation of the gate potential Vg and the source potential Vs of the driving transistor 32.

Referring to FIG. 4, the period to time $t_1$ is a light emitting period $T_1$ within which emission of light in the preceding horizontal period (1H) continues.

A period from time $t_1$ at which the light emitting period $T_1$ ends to time $t_2$ is a threshold value correction preparation period $T_3$ within which the gate potential Vg and the source potential Vs of the driving transistor 32 are initialized to make preparations for a threshold voltage correction operation.

Within the threshold value correction preparation period $T_2$, at time $t_1$, the power supply scanner 14 changes over the potential of the power supply line DSL from the first high potential Vcc1 to the low potential Vss. Here, the threshold voltage of the light emitting element 34 is represented by Vthel. At this time, if the low potential Vss is set so as to satisfy Vss<Vthel+Vcat, then since the source potential Vs of the driving transistor 32 becomes substantially equal to the low potential Vss, the light emitting element 34 is placed into a reversely biased state and stops emission of light.

Then at time $t_2$, the write scanner 13 changes over the potential of the scanning line WSL to the high potential to turn on the sampling transistor 31. Consequently, the gate potential Vg of the driving transistor 32 is reset to the reference potential Vofs. The source potential Vs of the driving transistor 32 is reset to the low potential Vss of the image signal line DTL over a period of time from time $t_1$ to time $t_2$.

At this time, the gate-source voltage Vgs of the driving transistor 32 becomes Vofs−Vss. Here, if Vofs−Vss is not greater than the threshold voltage Vth of the driving transistor 32, then a next threshold value correction process cannot be carried out. Therefore, the reference potential Vofs and the low potential Vss are set so as to satisfy a relationship of Vofs−Vss>Vth.

A period from time $t_3$ to time $t_4$ is a threshold value correction period $T_3$ within which a threshold value correction operation is carried out. Within the threshold value correction period $T_3$, at time $t_3$, the potential of the power supply line DSL is changed over to the first high potential Vcc1 by the power supply scanner 14, and a voltage corresponding to the threshold voltage Vth is written into the accumulating capacitor 33 connected between the gate and the source of the driving transistor 32. In particular, as the potential of the power supply line DSL is changed over to the first high potential Vcc1, the source potential Vs of the driving transistor 32 rises and the gate-source voltage Vgs of the driving transistor 32 becomes equal to the threshold voltage Vth before time $t_4$ within the threshold value correction period $T_3$.

It is to be noted that, since the potential Vcat is set so that the light emitting element 34 is placed into a cutoff state within the threshold value correction period $T_3$, the drain-source current Ids of the driving transistor 32 flows to the accumulating capacitor 33 side but not to the light emitting element 34 side.

Within a writing+mobility correction preparation period $T_4$ from time $t_4$ to time $t_6$, the potential of the scanning line WSL is changed over from the high potential to the low potential. At this time, since the sampling transistor 31 is turned off, the gate of the driving transistor 32 is placed into a floating state. However, since the gate-source voltage Vgs of the driving transistor 32 is equal to the threshold voltage Vth, the driving transistor 32 is in a cutoff state. Accordingly, the drain-source current Ids does not flow to the driving transistor 32.

Then, at time $t_5$ after time $t_4$ before time $t_6$, the horizontal selector 12 changes over the potential of the image signal line DTL from the reference potential Vofs to the signal potential Vsig which corresponds to a gradation.

Thereafter, within a writing+mobility correction period $T_5$ from time $t_6$ to time $t_7$, writing of an image signal and a mobility correction operation are carried out at the same time. In particular, within the period from time $t_6$ to time $t_7$, the potential of the scanning line WSL is set to the high potential. Consequently, the signal potential Vsig corresponding to a gradation is written into the accumulating capacitor 33 in such a form that it is added to the threshold voltage Vth. Further, the voltage ΔVa for mobility correction is subtracted from the voltage retained in the accumulating capacitor 33.

Here, regarding the gate-source voltage Vgs of the driving transistor 32 at time $t_7$ after the writing+mobility correction period $T_5$ as Va, Va comes to an end is Vsig+Vth−ΔVa.

At time $t_7$ after the writing+mobility correction period $T_5$ comes to an end, the potential of the scanning line WSL is changed back to the low potential. Consequently, the gate of the driving transistor 32 is disconnected from the image signal line DTL and consequently is placed into a floating state. When the gate of the driving transistor 32 is in a floating state, since the accumulating capacitor 33 is connected between the gate and the source of the driving transistor 32, also the gate potential Vg varies in an interlocking relationship with the variation of the source potential Vs of the driving transistor 32. The operation of the gate potential Vg of the driving transistor 32 which varies in an interlocking relationship with the variation of the source potential Vs is a bootstrap operation by the accumulating capacitor 33.

After time $t_7$, as the gate of the driving transistor 32 is placed into a floating state and the drain-source current Ids of the driving transistor 32 begins to flow as driving current to the light emitting element 34, the anode potential of the light emitting element 34 rises in response to the driving current Ids. Also the gate-source voltage Vg of the driving transistor 32 rises similarly by a bootstrap operation. In particular, the gate potential Vg and the source potential Vs of the driving transistor 32 rise while the gate-source voltage Va of the driving transistor 32, which is equal to Vsig+Vth−ΔVa, is kept fixed. Then, when the anode potential of the light emitting element 34 exceeds Vthel+Vcat, the light emitting element 34 begins to emit light.

At the point of time $t_7$ after the writing+mobility correction period $T_5$ comes to an end, the correction of the threshold voltage Vth and the mobility μ is completed already, and therefore, the luminance of light to be emitted from the light emitting element 34 is not influenced by a dispersion of the threshold voltage Vth or the mobility μ of the driving transistor 32. In particular, the light emitting element 34 emits light with a light luminance equal among the pixels in response to the signal potential Vsig without being influenced by a dispersion of the threshold voltage Vth or the mobility μ of the driving transistor 32.

Then, at time $t_8$ after a predetermined period of time elapses after time $t_7$, the potential of the image signal line DTL is dropped to the reference potential Vofs from the signal potential Vsig.

In each of the pixels 21 of the EL panel 10, the light emitting element 34 can be driven to emit light without being influenced by the threshold voltage Vth or the mobility μ of the driving transistor 32 in such a manner as described above. Accordingly, with the display apparatus 1 which uses the EL panel 10, a display image of high quality can be obtained.

[Determination Method of the Writing+Mobility Correction Period $T_5$]

Here, a determination method of the writing+mobility correction period $T_5$ is described with reference to FIGS. 5 and 6.

Figure 5:
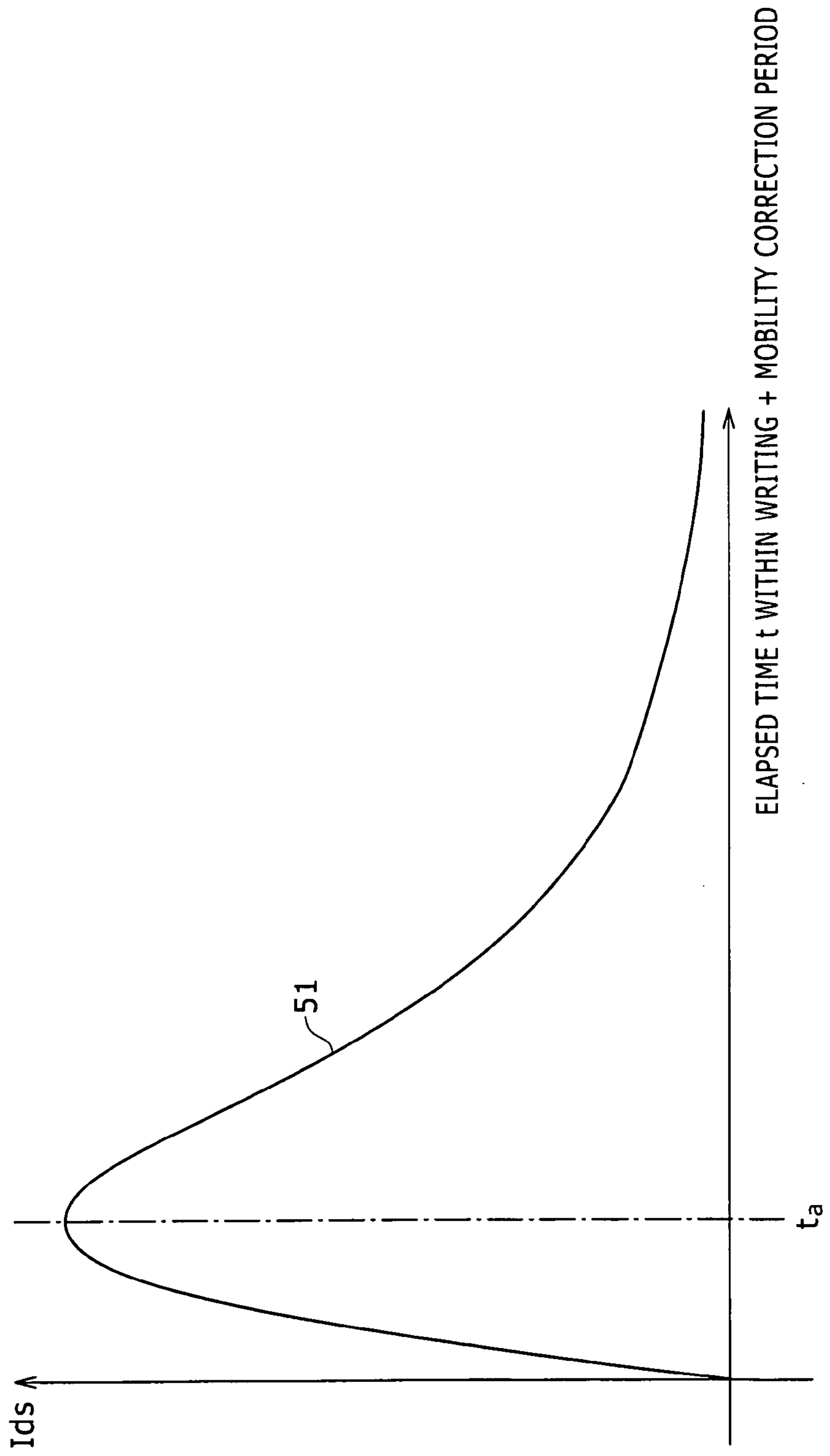
FIGS. 5 and 6 are graphs illustrating a determination method for a writing+mobility correction period.

FIG. 5 shows a curve 51 which indicates a relationship between the elapsed time t within the writing+mobility correction period $T_5$ and the drain-source current. Ids of the driving transistor 32. It is to be noted that the curve 51 is hereinafter referred to as current curve 51.

Within the writing+mobility correction period $T_5$, the EL panel 10 carries out writing of the signal potential Vsig and mobility correction simultaneously.

The writing operation of an image signal of the signal potential Vsig raises the gate potential Vg of the driving transistor 32 up to the signal potential Vsig. Accordingly, the gate-source voltage Vgs of the driving transistor 32 by the writing operation of the image signal varies in an increasing direction.

On the other hand, the variation of the gate-source voltage Vgs of the driving transistor 32 only by mobility correction can be represented by the following expression (1) using the elapsed time t from time $t_{16}$ at the beginning of the writing+mobility correction period $T_5$ as a variable:

$$Vgs(t) = Vth + \frac{1}{\frac{1}{Vgs(0) - Vth} + \frac{\beta \cdot t}{2Cs}} \tag{1}$$

where β is a constant fixed with regard to the driving transistor 32 and is represented by the following expression (2) using a mobility μ, a gate width W, a gate length L and a gate oxide film capacitance Cox per unit area:

$$\beta = \frac{W}{L} \cdot \mu \cdot Cox \tag{2}$$

It is to be noted that Vgs(0) in the expression (1) above represents the gate-source voltage Vgs of the driving transistor 32 where the elapsed time t is t=0.

Accordingly, according to the expression (1), the mobility correction operation lowers the gate-source voltage Vgs of the driving transistor 32.

Accordingly, the gate-source voltage Vgs of the driving transistor 32 within the writing+mobility correction period $T_5$ gradually rises as a whole to time $t_a$ since the rise thereof by writing of the signal potential Vsig and the drop thereof by the mobility correction somewhat cancel each other. In a corresponding relationship, also the drain-source current Ids of the driving transistor 32 rises in response to the time t till time $t_a$ as indicated by the current curve 51.

Then, after time $t_a$ at which the rise of the gate potential Vg of the driving transistor 32 by the writing of the signal potential Vsig ends, since only the rise of the gate-source voltage Vgs by the mobility correction acts, the gate-source voltage Vgs of the driving transistor 32 gradually decreases. In a corresponding relationship, also the drain-source current Ids decreases in response to the time t after time $t_a$ as indicated by the current curve 51.

Figure 6:
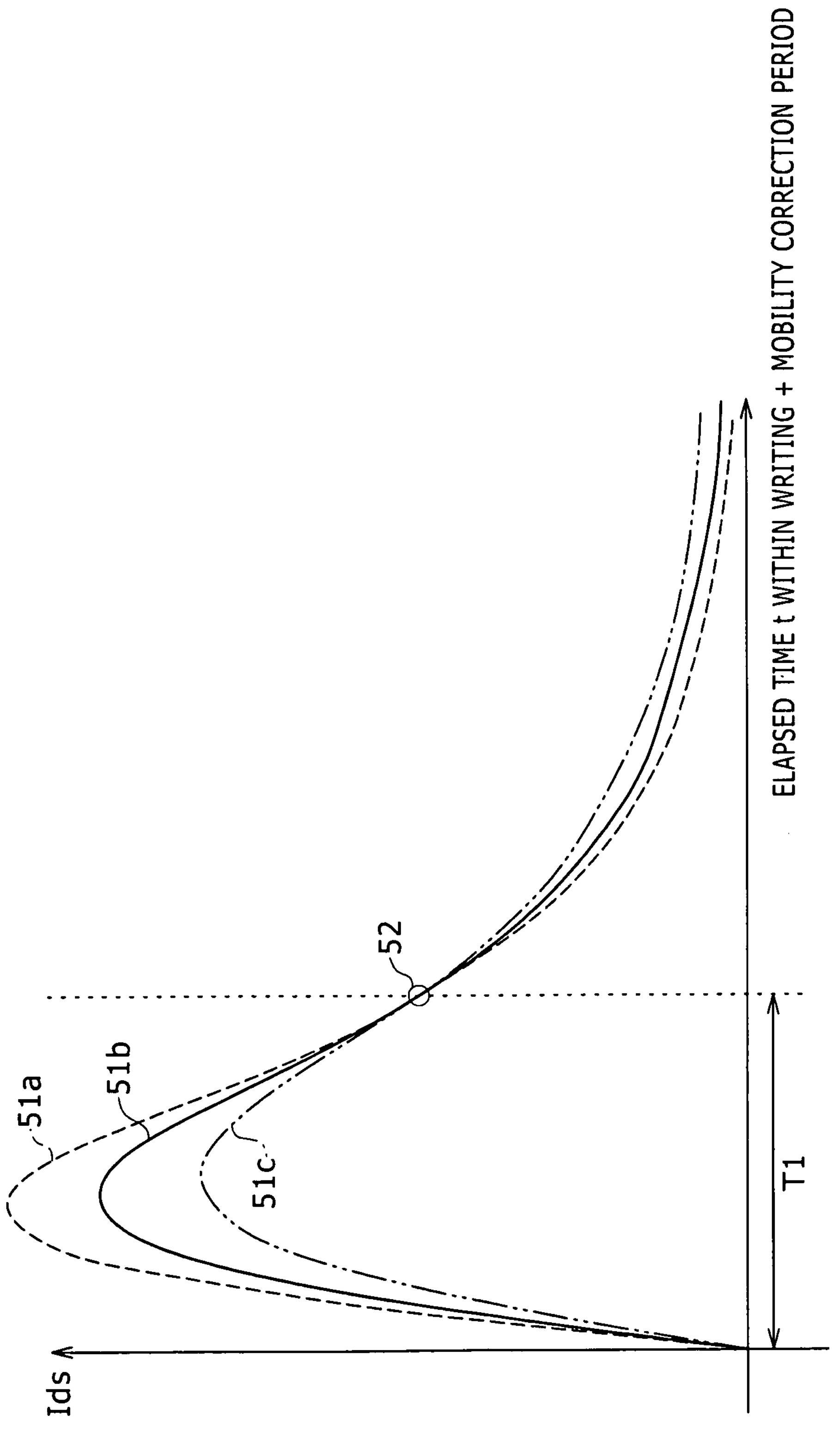

Here, where the mobility μ of the driving transistor 32 is different, the current curve 51 of FIG. 5 differs as seen in FIG. 6.

In particular, FIG. 6 illustrates a variation of the current curve 51 in response to a difference of the mobility μ of the driving transistor 32.

A current curve 51*a* represents a current curve of the driving transistor 32 where the mobility μ is high. Another current curve 51*c* represents a current curve of the driving transistor 32 where the mobility μ is low. A further current curve 51*b* indicates a current curve of the driving transistor 32 which has an average mobility μ among the pixels 21 of the EL panel 10.

In the current curve 51*a* where the mobility μ is high, not only a rise but also a fall of the drain-source current Ids exhibit a steep gradient.

On the other hand, in the current curve 51*c* where the mobility μ is low, not only a rise but also a fall of the drain-source current Ids of the driving transistor 32 exhibit a moderate gradient.

Then, even if the mobility μ of the driving transistor 32 is different, a point 52 at which the current curves 51*a* to 51*c* overlap with each other exists at a point of time after lapse of a predetermined period of time, in FIG. 6, after lapse of a period of time of $T_1$, after the point of time at which the writing+mobility correction period $T_5$ starts. In other words, at the point 52 after lapse of the period of time of $T_1$ after the point of time at which the writing+mobility correction period $T_5$ starts, the drain-source current Ids of the driving transistor 32 exhibits coincidence. The period of time of $T_1$ which provides the point 52 at which the drain-source current Ids of the driving transistor 32 exhibits coincidence is determined as the writing+mobility correction period $T_5$. Consequently, even if the mobility μ of the driving transistor 32 has a dispersion among the pixels 21, the equal drain-source current Ids of the driving transistors 32 can be supplied. In other words, the mobility μ of the driving transistor 32 which composes each pixel 21 can be corrected.

However, in other words, where the circuit constant of the pixel 21 is fixed, the period of time of $T_1$ to the point 52 at which the current curves 51*a* to 51*c* overlap with each other does not vary. Accordingly, the time for driving one pixel cannot be reduced, and this makes it difficult to achieve high speed driving.

[Configuration of the Display Apparatus to Which the Embodiment of the Invention is Applied]

Based on the above-described display apparatus shown in FIG. 1, a description is made in the following for a display apparatus that realizes to shorten the period of time for the mobility correction and high speed driving.

Figure 7:
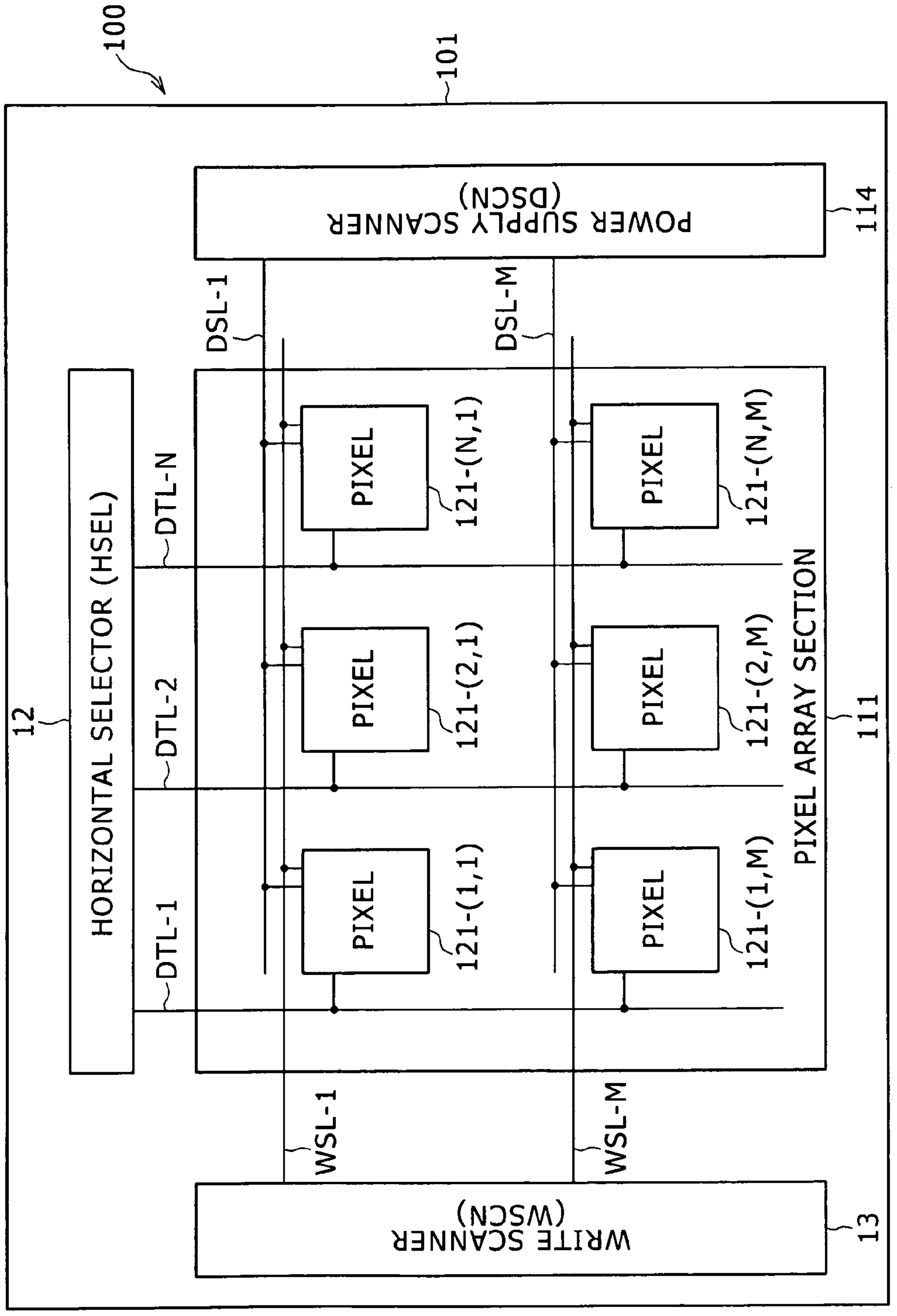
FIG. 7 is a block diagram showing an example of a configuration of a display apparatus to which the present invention is applied.

FIG. 7 illustrates a display apparatus according to an embodiment of the present invention.

Referring to FIG. 7, the display apparatus 100 shown includes an EL panel 101 which is an improvement of the EL panel 10 shown in FIG. 1. The display apparatus 100 has a configuration similar to that of the display apparatus 1 described hereinabove with reference to FIG. 1 except that it includes the EL panel 101 in place of the EL panel 10 shown in FIG. 1.

Like elements in the EL panel 101 to those of the display apparatus 1 are denoted by like reference characters and overlapping description of them is omitted herein to avoid redundancy while only different elements from those of the EL panel 10 are described below.

The EL panel 101 includes a pixel array section 111 having a plurality of pixels 121, a horizontal selector 12, a write scanner 13 and a power supply scanner 114.

The pixel array section 111 includes N×M pixels 121-(1,1) to 121-(N,M) arranged in a matrix similarly as in the EL panel 10. It is to be noted that, where there is no necessity to particularly distinguish the pixels 121-(1,1) to 121-(N,M) from each other, each of them is referred to simply as pixel 121 similarly as in the example described hereinabove.

In the EL panel 101 shown in FIG. 7, the connection of the power supply lines DSL to the pixels 121 and the power supply scanner 114 is different from that in the EL panel 10 shown in FIG. 1 as hereinafter described with reference to FIG. 8. Therefore, also the power supply scanner 114 carries out driving in a different manner from the power supply scanner 14 shown in FIG. 1.

Now, the connection of the power supply lines DSL to the pixels 121 and the power supply scanner 114 and driving of the power supply scanner 114 are described with reference to FIG. 8.

[Example of a Detailed Configuration of the EL Panel 101]

Figure 8:
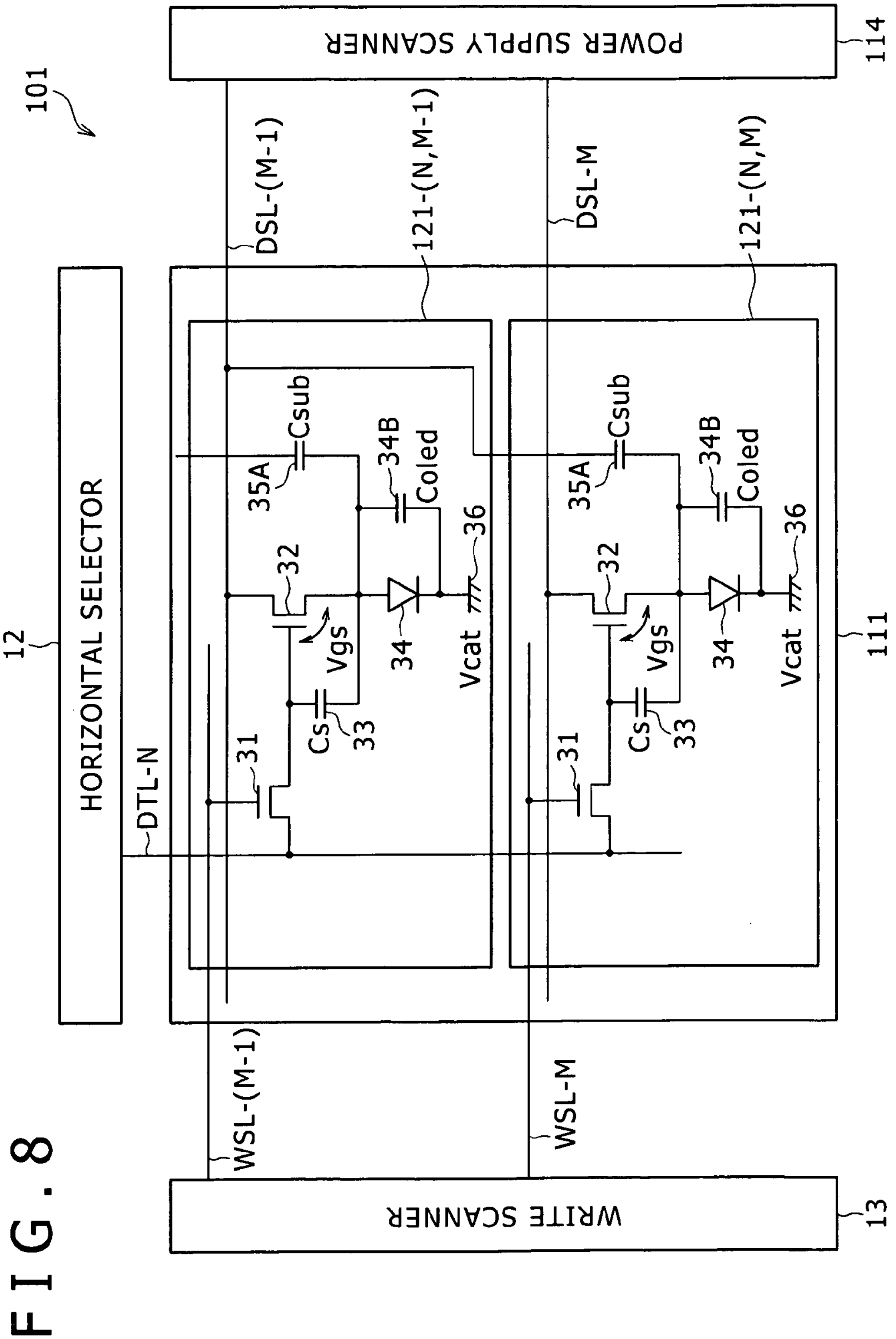
FIG. 8 is a block diagram showing a configuration of an equivalent circuit of a pixel shown in FIG. 7.

FIG. 8 shows an example of a detailed configuration of the EL panel 101.

FIG. 8 particularly shows an equivalent circuit of two pixels 121 juxtaposed in the direction of a column from among the N×M pixels 121 included in the EL panel 101 and shows a configuration of the pixels 121-(N,M−1) and 121-(N,M). It is to be noted that also the other pixels 121 not shown have a similar configuration to that of the pixels 121-(N,M−1) and 121-(N,M).

The pixel 121-(N,M) includes a sampling transistor 31, a driving transistor 32, an accumulating capacitor 33, a light emitting element 34, a light emitting element capacitor 34B and an auxiliary capacitor 35A.

Also the pixel 121-(N,M−1) at the preceding stage, that is, preceding by one row distance, to the pixel 121-(N,M) in line-sequential scanning includes a sampling transistor 31, a driving transistor 32, a accumulating capacitor 33, a light emitting element 34, a light emitting element capacitor 34B and an auxiliary capacitor 35A.

Accordingly, the components of the pixels 121 of the EL panel 101 are similar to those of the pixels 21 of the EL panel 10 described hereinabove with reference to FIG. 3. However, the connection destination of one of the electrodes of the auxiliary capacitor 35A is different from that of the pixel 21 of the EL panel 10 described hereinabove with reference to FIG. 3.

In particular, while, in the pixel 21, one of the electrodes of the auxiliary capacitor 35A is connected to the cathode side in the same pixel, in the pixel 121-(N,M), one of the electrodes of the auxiliary capacitor 35A is connected to the power supply line DSL-(M−1) to the pixel 121-(N,M−1) at the preceding stage. Also the auxiliary capacitor 35A of the pixel 121-(N,M−1) is connected, at the electrode thereof on the opposite side connected to the anode of the light emitting element 34, to the power supply line DSL-(M−2) to the pixel 121-(N,M−2) not shown.

The power supply scanner 114 changes, within a horizontal period (1F) for the pixel 121-(N,M), not only the power supply potential of the power supply line DSL-M but also the power supply potential of the power supply line DSL-(M−1) to the pixel 121-(N,M−1) to which the one electrode of the auxiliary capacitor 35A is connected for a predetermined period of time. Further, the power supply scanner 114 changes, for a horizontal period for the pixel 121-(N,M−1), not only the power supply potential to the power supply line DSL-M but also the power supply potential to the power supply line DSL-(M−2) for the pixel 121-(N,M−2) for a predetermined period of time.

[Operation of the Pixels 121 of the EL Panel 101]

Operation of the pixels 121 is described with reference to FIG. 9 taking the pixel 121-(N,M) from between the two pixels 121-(N,M) and 121(N,M−1) shown in FIG. 8 as an example.

Figure 9:
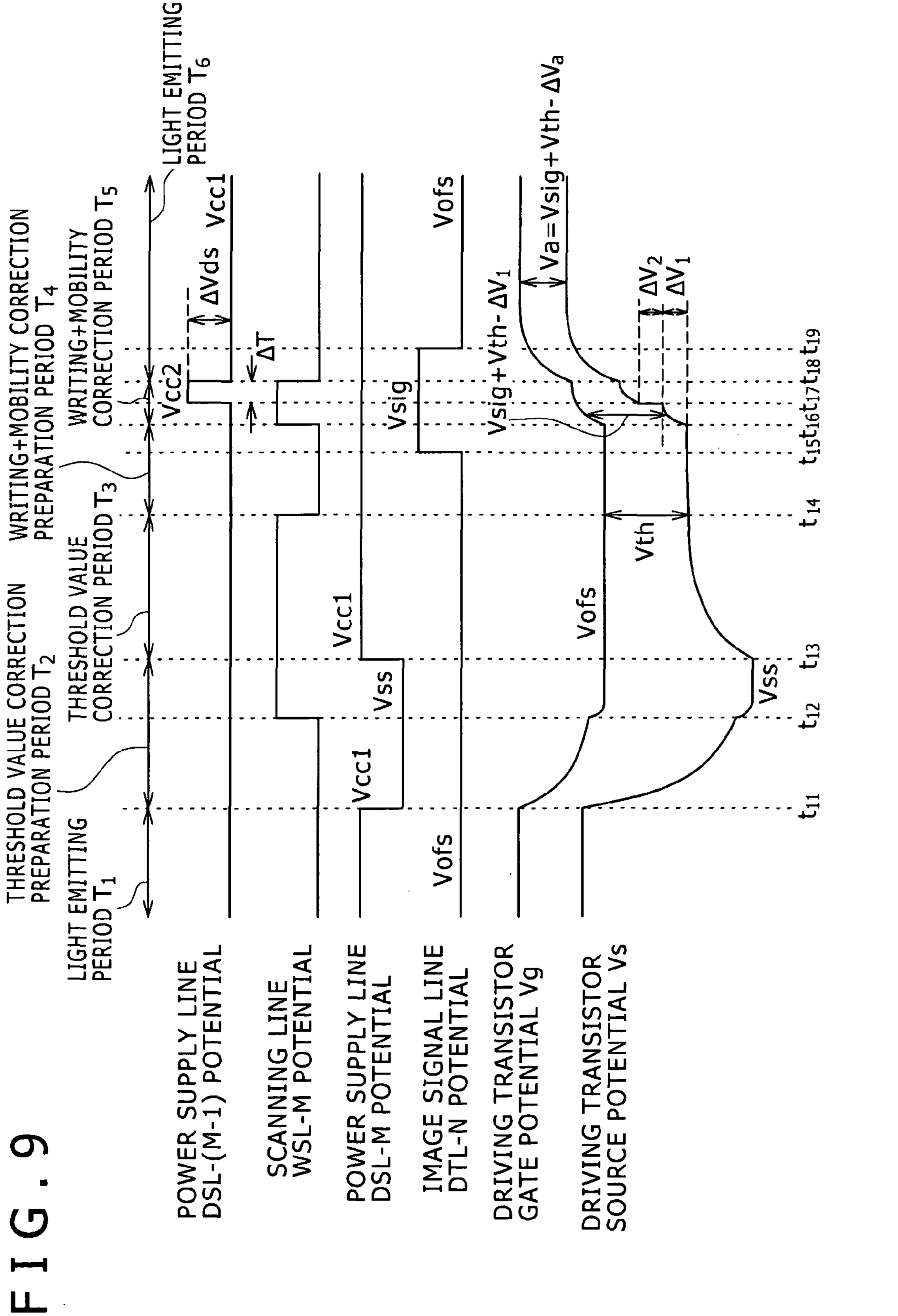
FIG. 9 is a timing chart illustrating operation of a pixel shown in FIG. 7.

FIG. 9 illustrates the potential of the power supply line DSL-(M−1) in addition to the potentials of the scanning line WSL-M, power supply line DSL-M and image signal line DTL-M connected to the pixel 121-(N,M) and the gate potential Vg and the source potential Vs of the driving transistor 32 similar to those illustrated in FIG. 4.

Operation from time $t_{11}$ to time $t_{16}$ is similar to that from time $t_1$ to time $t_6$ illustrated in FIG. 4. Therefore, overlapping description of the operation is omitted herein to avoid redundancy.

As the writing+mobility correction period $T_5$, at time $t_{16}$, the write scanner 13 changes over the potential of the scanning line WSL-M to the high potential to turn on the sampling transistor 31. Consequently, writing of the image signal and mobility correction are started simultaneously. In particular, the signal potential Vsig corresponding to a gradation is written into the accumulating capacitor 33 in such a form as to be added to the threshold voltage Vth. Meanwhile, a voltage ΔV for mobility correction is subtracted from a voltage retained in the accumulating capacitor 33.

At time $t_1$ later than a point of time after the writing of the image signal from between the writing of the image signal and the mobility correction started simultaneously ends, the power supply scanner 14 sets or raises the potential of the power supply line DSL-(M−1) to a second high potential Vcc2 which is higher by ΔVds than the first high potential Vcc1.

After the potential of the power supply line DSL-(M−1) is set to the second high potential Vcc2 which is higher by ΔVds than the first high potential Vcc1, charge is accumulated into the auxiliary capacitor 35 connected to the power supply line DSL-(M−1) and the source potential Vs of the driving transistor 32 rises. Consequently, the rise of the source potential Vs of the driving transistor 32 by the mobility correction operation is assisted by the auxiliary capacitor 35.

As the rise of the source potential Vs of the driving transistor 32 is assisted by the auxiliary capacitor 35, the period of time until the gate-source voltage Vgs of the driving transistor 32 becomes equal to $Va=Vsig+Vth-\Delta V_a$, same as that in the case of FIG. 4, is shortened.

In particular, it is assumed that, by setting the potential of the power supply line DSL-(M−1) to the second high potential Vcc2 at time $t_{17}$, the source potential Vs of the driving transistor 32 rises by $\Delta V_2$. Then, if it is assumed that, by the driving control in the EL panel 10 shown in FIG. 1, a period of time of ΔTx is required for the rise of the source potential Vs of the driving transistor 32 by $\Delta V_2$, then the writing+mobility correction period $T_5$ can be shortened by the period of time of ΔTx.

Thereafter, at time $t_{18}$ after lapse of a period of time of ΔT from time $t_{17}$, the power supply scanner 14 changes the potential of the power supply line DSL-(M−1) back to the first high potential Vcc1.

Operation after time $t_{18}$ after the end of the mobility correction is similar to that after time $t_7$ in FIG. 4.

[Effect Achieved by the Rise of the Potential of the Power Supply Line DSL-(M−1) by ΔVds]

Figure 10:
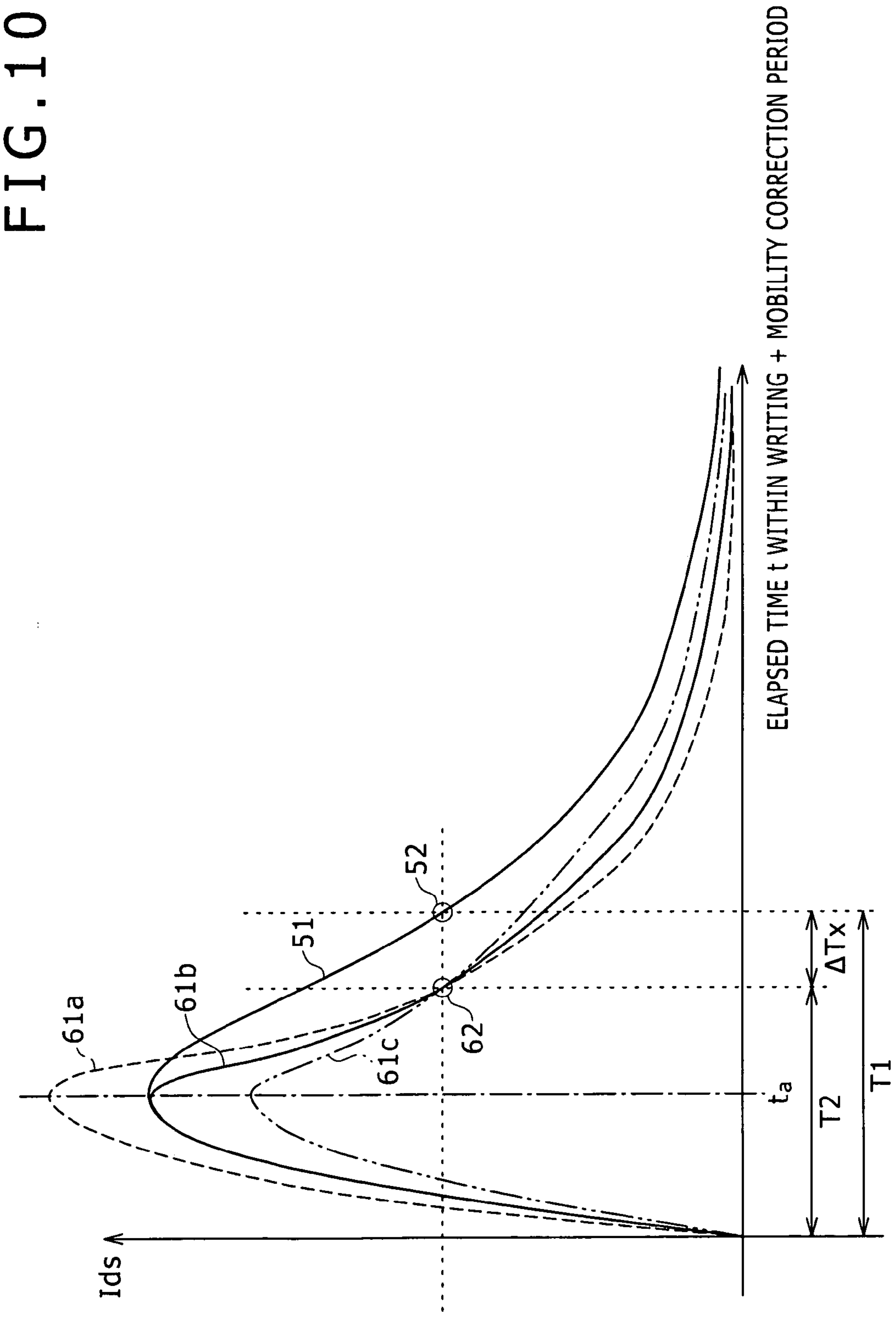
FIG. 10 is a graph illustrating an effect of the present invention.

FIG. 10 illustrates an effect achieved when the potential of the power supply line DSL-(M−1) is set to the second high potential Vcc2 higher by ΔVds than the first high potential Vcc1 within the writing+mobility correction period $T_5$.

In the EL panel 101, the relationship between the elapsed time t within the writing+mobility correction period $T_5$ and the drain-source current Ids of the driving transistor 32 is such as indicated by current curves 61*a* to 61*c* in FIG. 10 depending upon the difference of the mobility μ among the driving transistors 32.

The current curve 61*a* indicates a current variation where the mobility is high while the current curve 61*c* indicates a current variation where the mobility is low similarly as in FIG. 6.

The current curves 61*a* to 61*c* have a steeper gradient at a portion thereof later than time $t_a$ than the current curve 51. In particular, the reduction ratio of the drain-source current Ids of the driving transistor 32 later than the point of time at which writing of the signal potential Vsig ends is increased by the assistance of the auxiliary capacitor 35.

Then, the period of time of $T_2$ from the point of time of starting of the writing+mobility correction period $T_5$ to a point 62 at which the current curves 61*a* to 61*c* overlap with each other is reduced by ΔTx from the period of time of $T_1$ in the case of the EL panel 10 of the display apparatus 1. Since this period of time of $T_2$ to the point 62 at which the current curves 61*a* to 61*c* overlap with each other is set as the writing+mobility correction period $T_5$ as described above, the writing+mobility correction period $T_5$ in the EL panel 101 is shorter than the writing+mobility correction period $T_5$ in the EL panel 10.

In other words, with the EL panel 101 of the display apparatus 100, the time required for mobility correction can be reduced. Further, since the time required for mobility correction is reduced, higher speed driving can be anticipated.

The present invention is not limited to the embodiment described hereinabove and various modifications may be made without departing from the subject matter of the present invention.

While, in the example described above, one of the electrodes of the auxiliary capacitor 35A of a pixel 121 is connected to the power supply line DSL to another pixel 121 in the same column and at the preceding stage, it may otherwise be connected to the power supply line DSL for a pixel 121 which is in the same column and at the following stage, that is, in a turn later by one row distance in the order of line-sequential scanning. In particular, the electrode of the auxiliary capacitor 35A on the opposite side on which the auxiliary capacitor 35A is connected to the anode of the light emitting element 34 may be connected to the power supply line DSL to a pixel 121 adjacent in the direction of a column.

Further, while the pixel 121 is formed from a pixel circuit including two transistors and two capacitors as described hereinabove with reference to FIG. 8, it may be formed in some other circuit configuration. It is to be noted that the pixel circuit described is hereinafter referred to as 2Tr/2C pixel circuit.

Further, as a different circuit configuration of the pixel 121, for example, the following circuit configuration can be adopted. In particular, it is possible to adopt a configuration which includes first to third transistors in addition to a 2Tr/2C pixel circuit, that is, five transistors and two capacitors. The configuration just described is hereinafter referred to as 5Tr/2C pixel circuit. Where the pixel 121 adopts the 5Tr/2C pixel circuit, the signal potential to be supplied from the horizontal selector 12 to the sampling transistor 31 through the image signal line DTL is fixed to the signal potential Vsig. As a result, the sampling transistor 31 only functions to switch supply of the signal potential Vsig to the driving transistor 32. Further, the potential to be supplied to the driving transistor 32 through the power supply line DSL are the first high potential Vcc1 and the second potential Vcc2. Further, the first transistor newly added switches supply of the first high potential Vcc1 to the driving transistor 32. The second transistor switches supply of the low potential Vss to the driving transistor 32. Further, the third transistor switches supply of the reference potential Vofs to the driving transistor 32.

Further, as another different circuit configuration of the pixel 121, an intermediate configuration between the 2Tr/2C pixel circuit and the 5Tr/2C pixel circuit may be adopted. In particular, a configuration which includes four transistors and two capacitors, that is, a 4Tr/2C pixel circuit, or a configuration which includes three transistors and one capacitor, that is, a 3Tr/2C pixel circuit, can be adopted. The 4Tr/2C pixel circuit may be configured such that, for example, the third transistor of the 5Tr/2C pixel circuit is omitted and the signal potential to be supplied from the horizontal selector 12 to the sampling transistor 31 is formed as a pulse signal using the signal potential Vsig and the reference potential Vofs.

The present application contains subject matter related to that disclosed in Japanese Priority Patent Application JP 2009-098815 filed in the Japan Patent Office on Apr. 15, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:

a pixel array section including a plurality of pixels disposed in rows and columns;

a number of power supply lines equal to the number of the rows of the pixels, each of said power supply lines being wired commonly to those of said pixels which are juxtaposed in a direction of a row; and a power supplying section adapted to supply a predetermined power supply potential to said pixels in the rows through said power supply lines;

each of said pixels including a light emitting element having a diode characteristic and adapted to emit light in response to driving current, a sampling transistor adapted to sample an image signal, a driving transistor adapted to supply the driving current to said light emitting element, an accumulating capacitor connected between an anode of said light emitting element and a gate of said driving transistor and adapted to retain a predetermined potential, and an auxiliary capacitor connected between the anode of said light emitting element and the power supply line for an adjacent pixel positioned adjacent the pixel in a direction of a column and adapted to retain a predetermined potential;

said power supplying section temporarily raising, during mobility correction of the pixel, the power supply potential of the power supply line for the adjacent pixel to which said auxiliary capacitor is connected.

2. The display apparatus according to claim 1, wherein said power supplying section starts a writing operation of a signal potential of the image signal into said accumulating capacitor and a mobility correction operation simultaneously.

3. The display apparatus according to claim 1, wherein said power supplying section temporarily raises, during the mobility correction after the writing of the signal potential of the image signal into said accumulating capacitor ends, the power supply potential of the power supply line for the adjacent pixel to which said auxiliary capacitor is connected.

4. The display apparatus according to claim 1, wherein the adjacent pixel positioned adjacent the pixel in the direction of a column is a pixel positioned at a preceding stage in an order of line-sequential scanning.

5. A driving controlling method for a display apparatus which includes a pixel array section including a plurality of pixels disposed in rows and columns, a number of power supply lines equal to the number of the rows of the pixels, each of the power supply lines being wired commonly to those of the pixels which are juxtaposed in a direction of a row, and a power supplying section adapted to supply a predetermined power supply potential to the pixels in the rows through the power supply lines and wherein each of the pixels including a light emitting element having a diode characteristic and adapted to emit light in response to driving current, a sampling transistor adapted to sample an image signal, a driving transistor adapted to supply the driving current to the light emitting element, an accumulating capacitor connected between an anode of the light emitting element and a gate of the driving transistor and adapted to retain a predetermined potential, and an auxiliary capacitor connected between the anode of the light emitting element and the power supply line for an adjacent pixel positioned adjacent the pixel in a direction of a column and adapted to retain a predetermined potential, the method comprising:

a step executed by the power supplying section of temporarily raising, during mobility correction of the pixel, the power supply potential of the power supply line for the adjacent pixel to which the auxiliary capacitor is connected.

6. A pixel circuit for a pixel array having pixels disposed in a row direction and a column direction, the pixel circuit comprising:

a light emitting element having an anode and configured to emit light in response to a driving current;

a sampling transistor configured to sample an image signal;

a driving transistor configured to receive a power supply potential from a power supply line, and to supply the driving current to the light emitting element;

a first capacitor connected between the anode of the light emitting element and a gate of the driving transistor and configured to retain a signal potential corresponding to the image signal; and a second capacitor having a first terminal connected to the anode of the light emitting element and a second terminal connected to a second power supply line for another pixel circuit from a separate row of pixels that is adjacent to the pixel circuit in the column direction, wherein during a correction operation for a characteristic of the driving transistor, the second terminal of the second capacitor receives, from the second power supply line, a potential that is greater than the power supply potential.

7. The pixel circuit according to claim 6, wherein the correction operation occurs simultaneously with a writing operation of the signal potential into the first capacitor.

8. The pixel circuit according to claim 6, wherein the correction operation occurs after a writing operation of the signal potential into the first capacitor.

9. The pixel circuit according to claim 6, wherein the separate row of pixels is from a preceding stage in an order of line-sequential scanning.

10. The pixel circuit according to claim 6, wherein the correction operation executes a mobility correction for the driving transistor.

11. A display device comprising the pixel circuit according to claim 6.

12. An electronic apparatus comprising the display device according to claim 11.

* * * * *